(12) United States Patent
Tabaru

(10) Patent No.: US 9,477,465 B2
(45) Date of Patent: Oct. 25, 2016

(54) ARITHMETIC PROCESSING APPARATUS, CONTROL METHOD OF ARITHMETIC PROCESSING APPARATUS, AND A COMPUTER-READABLE STORAGE MEDIUM STORING A CONTROL PROGRAM FOR CONTROLLING AN ARITHMETIC PROCESSING APPARATUS

(71) Applicant: FUJITSU LIMITED, Kawasaki-shi, Kanagawa (JP)

(72) Inventor: Tsuguchika Tabaru, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 449 days.

(21) Appl. No.: 14/030,175

(22) Filed: Sep. 18, 2013

(65) Prior Publication Data

US 2014/0149719 A1 May 29, 2014

(30) Foreign Application Priority Data

Nov. 27, 2012 (JP) .................................. 2012-258810

(51) Int. Cl.
- *G06F 9/22* (2006.01)
- *G06F 9/30* (2006.01)
- *G06F 9/38* (2006.01)

(52) U.S. Cl.
CPC ........... *G06F 9/3001* (2013.01); *G06F 9/3004* (2013.01); *G06F 9/30036* (2013.01); *G06F 9/3851* (2013.01); *G06F 9/3857* (2013.01); *G06F 9/3887* (2013.01)

(58) Field of Classification Search
CPC ........................................................ G06F 9/44
See application file for complete search history.

(56) References Cited

U.S. PATENT DOCUMENTS

| | | | |
|---|---|---|---|
| 8,370,845 B1 * | 2/2013 | Le Grand | G06F 9/522 718/106 |
| 2003/0120901 A1 | 6/2003 | Hokenek et al. | |
| 2009/0249026 A1 | 10/2009 | Smelyanskiy et al. | |
| 2010/0106932 A1 | 4/2010 | Ogasawara | |

FOREIGN PATENT DOCUMENTS

| | | |
|---|---|---|
| JP | 2005-514678 | 5/2005 |
| JP | 2010-102654 | 5/2010 |
| JP | 2011-514598 | 5/2011 |

OTHER PUBLICATIONS

Japanese Office Action mailed Apr. 26, 2016 in related Japanese Application No. 2012-258810.
Arata Notsu, "Multi-thread Application Created Using Intel C++ Compiler for Mac OS", Software Design, Japan, Gijutsu-Hyohron Co., Ltd., 18 Dec. 2006, vol. 194, pp. 140-145.

* cited by examiner

*Primary Examiner* — Cheng-Yuan Tseng
(74) *Attorney, Agent, or Firm* — Staas & Halsey LLP

(57) ABSTRACT

An arithmetic processing apparatus includes a plurality of arithmetic cores configured to execute threads in parallel, and a control unit configured to cause the arithmetic core to execute a reduction operation for data of the threads having the same storage area to which data is written per a predetermined number of threads in order to add data obtained by the reduction operation to data within a corresponding storage area by an atomic process.

6 Claims, 15 Drawing Sheets

FIG.6

| NUMBER OF LOOP ITERATIONS | tIDBlock=0 DATA VALUE =A, WRITE ADDRESS=a | tIDBlock=1 DATA VALUE =B, WRITE ADDRESS=b | tIDBlock=2 DATA VALUE =C, WRITE ADDRESS=c | tIDBlock=3 DATA VALUE =D, WRITE ADDRESS=c | tIDBlock=4 DATA VALUE =E, WRITE ADDRESS=a | tIDBlock=5 DATA VALUE =F, WRITE ADDRESS=b | tIDBlock=6 DATA VALUE =G, WRITE ADDRESS=c | tIDBlock=7 DATA VALUE =H, WRITE ADDRESS=c |
|---|---|---|---|---|---|---|---|---|
| 1 | sum=A (a) | sum=0 | sum=0 | sum=0 | sum=0 | sum=0 | sum=0 | sum=0 |
| 2 | sum=A | sum=B (b) | sum=0 | sum=0 | sum=0 | sum=0 | sum=0 | sum=0 |
| 3 | sum=A | sum=B | sum=C (d) | sum=0 (e) | sum=0 | sum=0 (c) | sum=0 (f) | sum=0 (g) |
| 4 | sum=A | sum=B | sum=C+D (h) | sum=0 (i) | sum=0 | sum=0 | sum=0 | sum=0 |
| 5 | sum=A | sum=B+F (j) | sum=C+D | sum=0 | | sum=0 (k) | sum=0 | sum=0 |
| 6 | sum=A | sum=B+F | sum=C+D+G (l) | sum=0 (m) | sum=0 | sum=0 | sum=0 (n) | sum=0 |
| 7 | sum=A | sum=B+F | sum= C+D+G+H (o) | sum=0 (p) | sum=0 | sum=0 | sum=0 (q) | sum=0 (r) |
| | ⇩ ATOMIC ADDITION | ⇩ ATOMIC ADDITION | ⇩ ATOMIC ADDITION | | | | | |

SUB-THREAD GROUP ST1

FIG. 8

```
1   __device__ __inline__ void atomicAddW(double* base, double data, int offset,
2                                          double* dataBuffer,int* offsetBuffer){
3       dataBuffer[threadIdx.x] = data;
4       offsetBuffer[threadIdx.x] = offset;
5       int tIDblock = threadIdx.x & (warpSize - 1);
6       int warpTop = threadIdx.x - tIDBlock;
7       double* wData = & (dataBuffer[warpTop])
8       int* wAddr = & (offsetBuffer[warpTop]);
9
10      double sum = 0;
11      unsigned int active = __brev(__ballot(true));
12      unsigned int mask = ~ (1 << (warpSize - 1));
13      for (int aID = __popc(active); aID - - ;){
14          int rID = __clz(active);
15          active &= mask >> rID;
16          if (offset == wAddr[rID]){
17              if (rID < tIDBlock){
18                  return;
19              }
20              sum += wData[rID];
21          }
22      }
23      atomicAdd(& (base[offset]), sum);
24  }
```

```
1  __global__ void FillHistogramKernel (double* dstData, int numBin,
2      double lower, double width, const double* srcData, int numData,
3      int numThreads) {
4    __shared__ double dataBuffer[128];
5    __shared__ int offsetBuffer[128];
6    unsigned int xID = (blockIdx.x * blockDim.x) + threadIdx.x;
7    if (xID < numThreads){
8      for (int offset = xID; offset < numData; offset += MAXIMUM_THREADS){
9        int binID = (srcData[offset] - lower) / width;
10       atomicAddW(dstData, 1, binID, dataBuffer, offsetBuffer);
11     }
12   }
13 }
```

FIG.10

```
1  __global__ void FillHistogramKernel (double* dstData, int numBin,
2     double lower, double width, const double* srcData, int numData,
3     int numThreads) {
4     unsigned int xID = (blockIdx.x * blockDim.x) + threadIdx.x ;
5     if (xID < numThreads) {
6        for (int offset = xID; offset < numData; offset += MAXIMUM_THREADS) {
7           int binID = (srcData[offset] - lower) / width;
8           atomicAdd(& (dstData[binID]), 1) ;
9        }
10    }
11 }
```

FIG. 13

```
1   __device__ __inline__ void atomicAddW(double * base, double data, int offset) {
2       int dataH = __double_as_longlong(data) >> 32;
3       int dataL = __double_as_longlong(data) ;
4       int laneID;
5       asm(" mov.s32 %0, %%laneid;" : "=r"(laneID)) ;
6       bool writeFlag = true ;
7
8       double sum = 0 ;
9       unsigned int active = __brev(__ballot(true)) ;
10      for (int aID = __popc(active) ; aID --;) {
11          int rID = __clz(active) ;
12          active ^= 1U << (warpSize - 1 - rID) ;
13          if (offset == __shfl(offset, rID)) {
14              if (rID < laneID) {
15                  writeFlag = false;
16              }
17              unsigned long long int dataLL = (unsigned int) __shfl(dataL, rID) ;
18              dataLL |= (unsigned long long int)(
19                  (unsigned int) __shfl(dataH, rID)) << 32 ;
20              sum += __longlong_as_double(dataLL) ;
21          }
22      }
23      if (writeFlag) {
24          atomicAdd(& (base[offset]), sum) ;
25      }
26  }
```

FIG.14

```
1   __device__ inline void atomicAddW(double* address, double data) {
2       int dataH = __double_as_longlong(data) >> 32 ;
3       int dataL = __double_as_longlong(data);
4       int addrH = (unsigned long long int)address >> 32 ;
5       int addrL = (unsigned long long int)address ;
6       int laneID ;
7       asm(" mov.s32 %0, %%laneid;" : "=r"(laneID)) ;
8       bool writeFlag = true ;
9
10      double sum = 0;
11      unsigned int active = __brev(__ballot(true)) ;
12      for (int aID = __popc(active); aID --;) {
13          int rID = __clz(active) ;
14          active ^= 1U << (warpSize - 1 - rID) ;
15          if ((addrL == __shfl(addrL, rID)) && (addrH == __shfl(addrH, rID))) {
16              if (rID < laneID) {
17                  writeFlag = false ;
18              }
19              unsigned long long int dataLL = (unsigned int)__shfl(dataL, rID) ;
20              dataLL |= (unsigned long long int) (
21                       (unsigned int)__shfl(dataH, rID)) << 32 ;
22              sum += __longlong_as_double(dataLL) ;
23          }
24      }
25      if (writeFlag) {
26          atomicAdd(address, sum) ;
27      }
28  }
```

FIG.15

```
1   __device__ inline double atomicAddWR(double* address, double data) {
2     int dataH = __double_as_longlong(data) >> 32 ;
3     int dataL = __double_as_longlong(data) ;
4     int addrH = (unsigned long long int)address >> 32 ;
5     int addrL = (unsigned long long int)address ;
6     int laneID ;
7     asm("mov.s32 %0, %%laneid;" : "=r"(laneID)) ;
8     int writerID = laneID ;
9
10    double sum = 0 ;
11    unsigned int active = __brev(__ballot(true)) ;
12    for (int aID = __popc(active); aID --;){
13       int rID = __clz(active) ;
14       active ^= 1U << (warpSize - 1 - rID) ;
15       if ((addrL == __shfl(addrL, rID)) && (addrH == __shfl(addrH, rID))) {
16          if (rID < laneID){
17             writerID = (rID < writerID) ? rID : writerID ;
18          }
19          else {
20             unsigned long long int dataLL = (unsigned int)__shfl(dataL, rID) ;
21             dataLL |= (unsigned long long int)(
22                   (unsigned int)__shfl(dataH, rID)) << 32 ;
23             sum += __longlong_as_double(dataLL) ;
24          }
25       }
26    }
27    double oldValue = 0 ;
28    if (writerID == laneID) {
29       oldValue = atomicAdd(address, sum) ;
30    }
31    {
32       int oldH = __double_as_longlong(oldValue) >> 32 ;
33       int oldL = __double_as_longlong(oldValue) ;
34       unsigned long long int dataLL = (unsigned int)__shfl(oldL, writerID);
35       dataLL |= (unsigned long long int)(
36             (unsigned int)__shfl(oldH, writerID)) << 32 ;
37       oldValue = __longlong_as_double(oldValue) ;
38    }
39    return oldValue + (sum - data) ;
40  }
```

ARITHMETIC PROCESSING APPARATUS, CONTROL METHOD OF ARITHMETIC PROCESSING APPARATUS, AND A COMPUTER-READABLE STORAGE MEDIUM STORING A CONTROL PROGRAM FOR CONTROLLING AN ARITHMETIC PROCESSING APPARATUS

CROSS-REFERENCE TO RELATED APPLICATION

This application is based upon and claims the benefit of priority from the prior Japanese Patent Application No. 2012-258810 filed on Nov. 27, 2012, the entire contents of which are incorporated herein by reference.

FIELD

The present disclosure relates to an arithmetic processing apparatus, a control method and a control program thereof.

BACKGROUND

An accelerator such as a GPU (Graphics Processing Unit) includes dozens to several thousands of arithmetic processing units or arithmetic cores, and is provided with a SIMD (Single Instruction Multiple Data) unit which is capable of processing multiple data values with a single instruction.

Since a reduction operation which is associative and commutative produces an operation result without being dependent on an operation sequence, the reduction operation may be processed in parallel using, for example, the SIMD unit. Here, the reduction operation is an order of operations which computes plural data values to obtain a single data value, and includes, for example, an addition, a multiplication, a computation of a maximum value, or a computation of a minimum value.

In the meantime, it is desirable to obtain an operation result of data using an atomic process in the reduction operation such as a histogram computation where a next destination-to-operation is determined by the operation result of data. The atomic process is a process in which reading of data from a storage device, executing of an operation such as addition and storing of the operation result of data in storage device, are executed without being interrupted by other processes or threads operating in parallel.

A technology of executing the reduction operation in a processor which is capable of performing the parallel processing has been devised. See, for example, Japanese Laid-open Patent Publication No. 2005-514678. A technology of efficiently executing the reduction operation in which a destination-to-write is changed for each term in the SIMD unit has been devised. See, for example, Japanese Laid-open Patent Publication No. 2011-514598. A scheme utilizing atomic process may be considered in order to execute the reduction operation in which the destination-to-write is changed for each term in a processor which is capable of performing a large-scale parallel processing of which the degree of parallelism is more than several thousands. However, when the accesses to the storage area in which data is recorded are competing, operations of the atomic process are sequentially executed and thus, a data processing efficiency becomes poor.

SUMMARY

According to one aspect of the present disclosure, an arithmetic processing apparatus includes a plurality of arithmetic cores configured to execute threads in parallel, and a control unit configured to cause the arithmetic core to execute a reduction operation for data of the threads having the same storage area to which data is written per a predetermined number of threads in order to add data obtained by the reduction operation to data within a corresponding storage area by an atomic process.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 illustrates an exemplary execution of the reduction operation according to the flow illustrated in FIG. 4.

FIG. 8 illustrates an exemplary control program executing the flow of the exemplary operation illustrated in FIG. 4.

FIG. 9 illustrates an exemplary control program which creates a histogram using an atomicAddW function illustrated in FIG. 8.

FIG. 10 illustrates an exemplary control program which creates a histogram using an atomicAdd function.

FIG. 13 illustrates another exemplary control program modified to execute the flow of the exemplary operation illustrated in FIG. 4 without using the shared memory.

FIG. 14 illustrates another exemplary control program modified to execute the flow of the exemplary operation illustrated in FIG. 4 without using the shared memory.

FIG. 15 illustrates another exemplary control program modified to execute the flow of the exemplary operation illustrated in FIG. 4 without using the shared memory.

DESCRIPTION OF EMBODIMENTS

When the reduction operation where the accesses to the storage area are competing is executed by the atomic process, the efficiency of data processing by the arithmetic processing apparatus is reduced as compared to a case where the atomic process is not generated.

The present disclosure intends to increase the operating speed of the arithmetic processing apparatus and enhance the efficiency of data processing by the arithmetic processing apparatus, as compared to conventional techniques.

In an arithmetic processing apparatus, a control method and a control program thereof according to one aspect of the present disclosure, the control unit of the arithmetic processing apparatus which includes a plurality of arithmetic cores executing threads in parallel causes the arithmetic cores to execute the reduction operation per a predetermined number of threads for data of threads having the same storage area to which the data is written and to add the data obtained by the reduction operation to the data stored within the corresponding storage area by the atomic process.

As compared to conventional techniques, the operating speed of the arithmetic processing apparatus may be increased and the efficiency of data processing performed by the arithmetic processing apparatus may be enhanced.

Hereinbelow, embodiments will be described with reference to the drawings.

Figure 1:
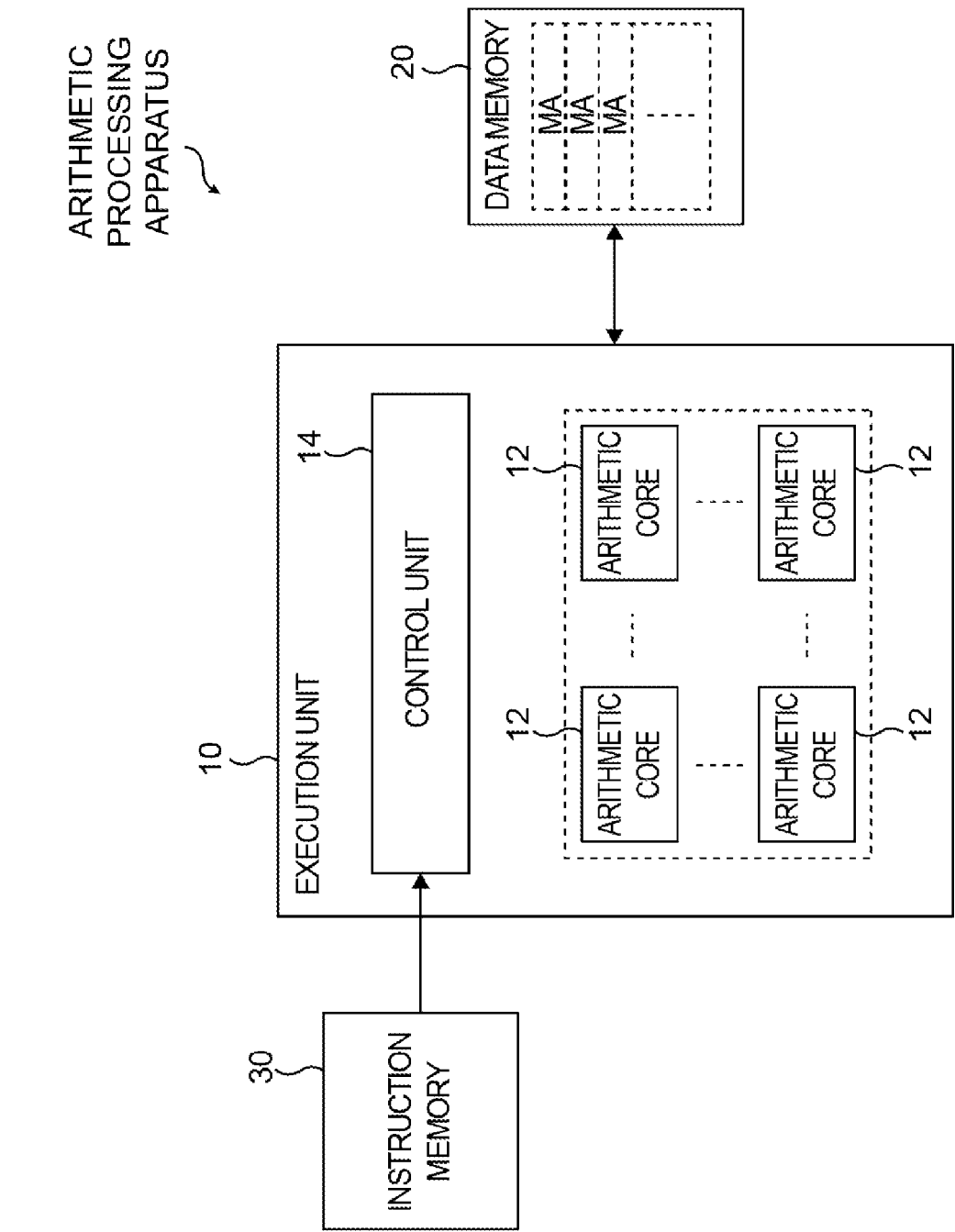
FIG. 1 illustrates an example of an arithmetic processing apparatus according to an embodiment.

FIG. 1 illustrates an example of an arithmetic processing apparatus according to an embodiment. For example, the arithmetic processing apparatus may be a Graphics Processing Unit (GPU). The GPU may be a General Purpose Graphics Processing Unit (GPGPU) which is capable of performing a general data processing.

The arithmetic processing apparatus may include an execution unit 10, a data memory 20 and an instruction memory 30. The execution unit 10 includes a plurality of arithmetic cores 12 which execute threads in parallel and a control unit 14 which controls the operation of the arithmetic cores 12. The control unit 14 may be configured to serve as a scheduler of the arithmetic cores 12 to divide the process to be executed into a plurality of threads, each of which is a minimal unit of a process, based on the control program stored in the instruction memory 30, and causes the arithmetic cores 12 to execute the divided threads in parallel. That is, the control unit 14 may cause the arithmetic cores 12 to execute the control program. Further, since a predetermined number of threads corresponding to the number of the plurality of the arithmetic cores 12 are executed by the plurality of the arithmetic cores 12 in parallel based on a common instruction, a synchronization is ensured per unit of instruction.

The data memory 20 includes a plurality of storage areas MA that are previously allocated. Data obtained through the operation of the arithmetic cores 12 is added to the data stored in each storage area MA. An addition of data to the storage area MA may be executed in such a manner that data is read from the storage area MA and modified (operation). The modified data may then be written to the storage area MA using a Read-Modify-Write operation. When the additions of data to a single storage area MA by the plurality of the arithmetic cores 12 are competing, data may be destroyed. Therefore, the addition of data to the storage area may be executed using an atomic process through which a data destruction by the competition may be avoided. In the following description, addition of data to the storage area by Read-Modify-Write operation is referred to as a write.

Figure 2:
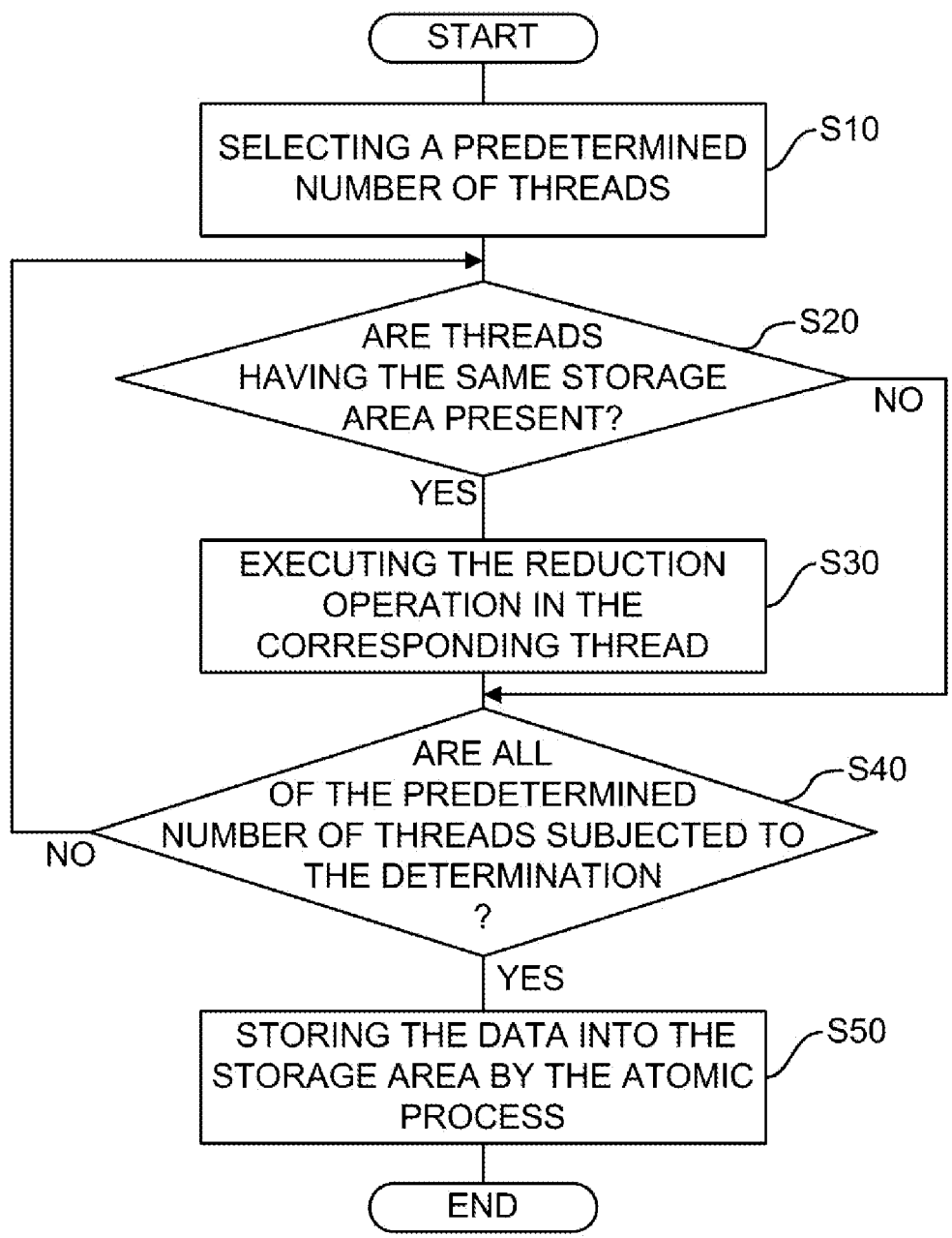
FIG. 2 illustrates an exemplary operation of the arithmetic processing apparatus illustrated in FIG. 1.

FIG. 2 illustrates an exemplary operation of the arithmetic processing apparatus illustrated in FIG. 1. The flow illustrated in FIG. 2 is implemented in such a manner that the control unit 14 causes the arithmetic cores 12 to execute a program stored in the instruction memory 30. That is, FIG. 2 illustrates the contents of a control program and the control method of the arithmetic processing apparatus.

At step S10, the execution unit 10 selects a predetermined number of threads among the plurality of threads executed by the control programs. In the embodiments after the embodiment described with reference FIG. 3, a lump of a plurality of threads used in execution of the control program is referred to as a thread group or a block, and a lump of the predetermined number of threads selected is referred to as a sub-thread group or a warp.

At step S20, the execution unit 10 retrieves whether there are threads having the same storage area MA to which data is written among the predetermined number of threads. When it is determined that a plurality of threads have the same storage areas MA to which data is written, the execution unit 10 executes the reduction operation for the data of the thread having the same storage area at step S30. For example, when three or more threads have the same storage area MA to which data is written, the operations are repeated causing one of the two threads to execute the reduction operation for data of another thread.

Figure 3:
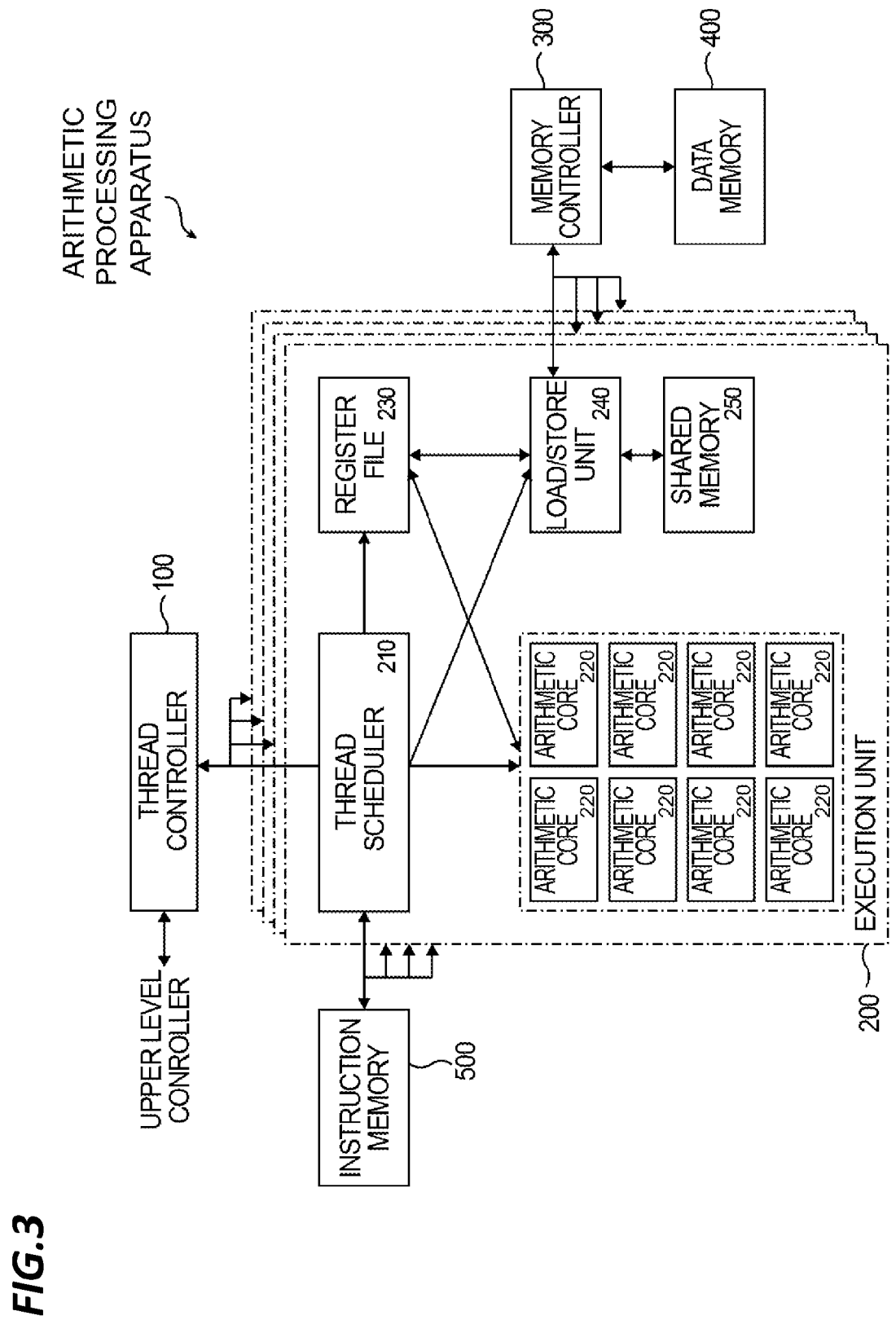
FIG. 3 illustrates an example of an arithmetic processing apparatus according to another embodiment.

Further, the reduction operation used in the embodiments after the embodiment described with reference FIG. 3 is assumed to be an operation which is executed using one type of operator with respect to plural terms which is associative and commutative. In this type of the reduction operation, a result may be obtained without being dependent on an order of arithmetic operation of the terms. The reduction operation may include, for example, an addition, a multiplication, a computation of a maximum value or a computation of a minimum value.

At step S40, when it is determined that there is a thread which is not subjected to the determination at step S20 among the predetermined number of threads selected, the execution unit 10 proceeds with step S20. Further, when it is determined that all of the predetermined number of threads are subjected to the determination at step S20, the execution unit 10 proceeds with step S50.

At step S50, the execution unit 10 adds the data obtained by the execution of the reduction operation at step S30 to data stored in the corresponding storage area MA by an atomic process. For example, writing of data into the storage area MA by the atomic process is executed by the thread which holds an operation result of the reduction operation.

In accordance with the flow illustrated in FIG. 2, the number of times that the atomic process is executed may be reduced as compared to a case where data of each of the predetermined number of threads is sequentially added to the data stored in the storage area MA by the atomic process. For example, even when the control unit 14 executes the operations of FIG. 2 in parallel while switching between the lumps of the predetermined number of threads, the number of times that the atomic process is executed may be reduced. As a result, as compared to conventional techniques, the operating speed of the arithmetic processing apparatus may be increased and the efficiency of data processing by the arithmetic processing apparatus may be improved.

As an example of the operation processed by the flow illustrated in FIG. 2, for example, there is an equation (1) as described below. In the equation (1), the storage area MA to which data is added is determined by a data value. In the equation (1), the term "$S_i$" represents the data to be added to the i-th storage area MA. In histogram, the variable "i" corresponds to a bin number, the term "$S_i$" corresponds to a bin height (frequency). The term "$a_j$" is the j-th data and the term "$f(a_j)$" is a function which obtains the storage area MA to which data is added to from the term "$a_j$". For example, in creating the histogram of height, the term "$a_j$" represents height data.

$$S_i = \sum_j a_j, \{f(a_j) = i\} \quad (1)$$

A parallelization of processes illustrated in the equation (1) has been implemented using the conventional atomic processes. In this embodiment, when the processes illustrated in the equation (1) are made to be parallel, an operation that can be processed by the reduction operation is executed before an atomic process is executed. Accordingly, as compared to conventional techniques, the number of times that the atomic process is executed may be reduced and thus, the frequency of the competition of the atomic process may be reduced. As a result, as compared to conventional techniques, the operating speed of the arithmetic processing apparatus may be increased and the efficiency of data processing by the arithmetic processing apparatus may be improved.

FIG. 3 illustrates an example of an arithmetic processing apparatus according to another embodiment. The arithmetic processing apparatus is, for example, the GPU. The arithmetic processing apparatus includes a thread controller 100, an execution unit 200, a memory controller 300, a data memory 400 and an instruction memory 500. The arithmetic processing apparatus includes, for example, a plurality of semiconductor chips installed on a substrate or a storage device. The thread controller 100, the execution unit 200, the memory controller 300, the data memory 400 and the instruction memory 500 are installed on any one of the semiconductor chips. Further, the thread controller 100, the execution unit 200, the memory controller 300, the data memory 400 and the instruction memory 500 may be installed on a single semiconductor chip.

The thread controller 100 receives an instruction from an upper level controller to execute a control program to determine the execution unit 200 which is needed to execute a thread group containing a plurality of threads and dispatches the thread group into the execution unit 200 which is determined as one responsible for executions. When the execution unit 200 capable of executing the thread group is not present, the thread controller 100 waits for dispatching of the thread group into the execution unit 200. Also, the thread controller 100 dispatches the thread group which is in a wait state into the execution unit 200 which has completed execution of the thread group. Further, when there is a room for thread execution capability of the execution unit 200, the thread controller 100 may dispatch a plurality of thread groups into a single execution unit 200.

Each execution unit 200 includes a thread scheduler 210, a plurality of arithmetic cores 220, a register file 230, a load/store unit 240 and a shared memory 250. The thread scheduler 210 has a function to allocate the thread of the thread group received from the thread controller 100 to the arithmetic core 220 and switch the threads executed in parallel by the plurality of arithmetic cores per a predetermined number of clock cycles. Further, in FIG. 3, the arithmetic processing apparatus includes four execution units 200, but may include at least one execution unit 200.

The thread scheduler 210 causes the arithmetic core 220 to execute the thread group dispatched from the thread controller 110 per sub-thread group containing the predetermined number of threads. For example, the sub-thread group contains the number of threads identical to the number of the arithmetic cores 220 within the execution unit 200 and includes a common instruction pointer. As such, the number of threads within the sub-thread group is determined with being dependent on hardware. In contrast, the number of threads within the thread group is determined with being dependent on a control program designed by a user. Therefore, when the number of threads of the thread group is less than that of the sub-thread group, the arithmetic core 220 which executes an invalid thread is generated. The operation result by the arithmetic core 220 which executes the invalid thread is masked by the control program.

Also, the threads of the sub-thread group are executed in parallel by the arithmetic cores 220 based on the instruction fetched from the instruction memory 500 by the thread scheduler 210. Since the threads of the sub-thread group are executed in parallel by the arithmetic cores 220 based on the common instruction, a synchronization is ensured per instruction. Here, a plurality of thread schedulers 210 of the plurality of execution units 200 and the instruction memory 500 may be connected with each other either through a common signal line or through independent signal lines.

In this example, each execution unit 200 includes eight arithmetic cores 220, but the number of the arithmetic core 220 may be two or more for each execution unit 200. As will be described later, the number of threads of the sub-thread group may be n-th power of two (n is a positive integer) in order to make a bit operation which obtains, for example, a thread number to be executed easily.

Further, the thread scheduler 210 has a function of allocating registers within the register file 230 used by the arithmetic core 220. Further, the thread scheduler 210 controls the load/store unit 240 and has a function of transferring data between the register file 230, the shared memory 250 and the data memory 400.

The register file 230 includes a plurality of registers. For example, the register is allocated for each arithmetic core 220 and the register allocated to one of the arithmetic cores 220 is not referenced by the other arithmetic cores 220. In view of the processing performance, the registers within the register files 230 may be parallelized to be processed by all of the threads of the sub-thread group synchronously or to be processed in several cycles. The data transferred from the shared memory 250 to the register through the load/store unit 240 is operated by the corresponding arithmetic core 220 and the operation result is written into the shared memory 250 through the load/store unit 240. That is, the plurality of the arithmetic cores 220 within each execution unit 200 execute the instruction fetched by the thread scheduler 210 in parallel using the data held in each corresponding register within the register file 230.

The load/store unit 240 transfers data between the register file 230 and the shared memory 250 based on the instruction fetched by the thread scheduler 210, or transfers data between the shared memory 250 and the data memory 400. For example, an area is allocated to each thread group in the shared memory 250 and the shared memory 250 allocated to one thread group is not referenced by other thread groups. The shared memory 250 is disposed within the execution unit 200 and thus, an access time to the shared memory 250 is shorter as compared to the data memory 400 disposed outside the execution unit. Further, the inside of the load/store unit 240 may be configured to be parallelized. In this case, when the accesses to other memory addresses from the threads of the thread group are generated simultaneously, the accesses may be processed simultaneously.

The memory controller 300 controls the access to the data memory 400 to output data read from the data memory 400 to the load/store unit 240, and writes data received from the load/store unit 240 to the data memory 400. Further, a plurality of load/store units 240 of the plurality of execution units 200 and the memory controller 300 may be connected with each other either through a common signal line or through independent signal lines.

The data memory 400 and the instruction memory 500 may be coexisted in a single semiconductor memory device or may be separately installed in each semiconductor memory device. Further, when the data memory 400 includes a plurality of semiconductor memory devices, the arithmetic processing apparatus may include a plurality of semiconductor memory controller each controls the access to the semiconductor memory device. Further, the arithmetic processing apparatus may include a data cache or an instruction cache.

Further, as the arithmetic processing apparatus illustrated in FIG. 3, for example, the GPU which is a product of NVIDIA (registered trademark) Corporation may be used. In this case, the execution unit 200 corresponds to a Streaming Multiprocessor (SM), and the thread group and the sub-thread group corresponds to a block and a warp, respectively.

Figure 4:
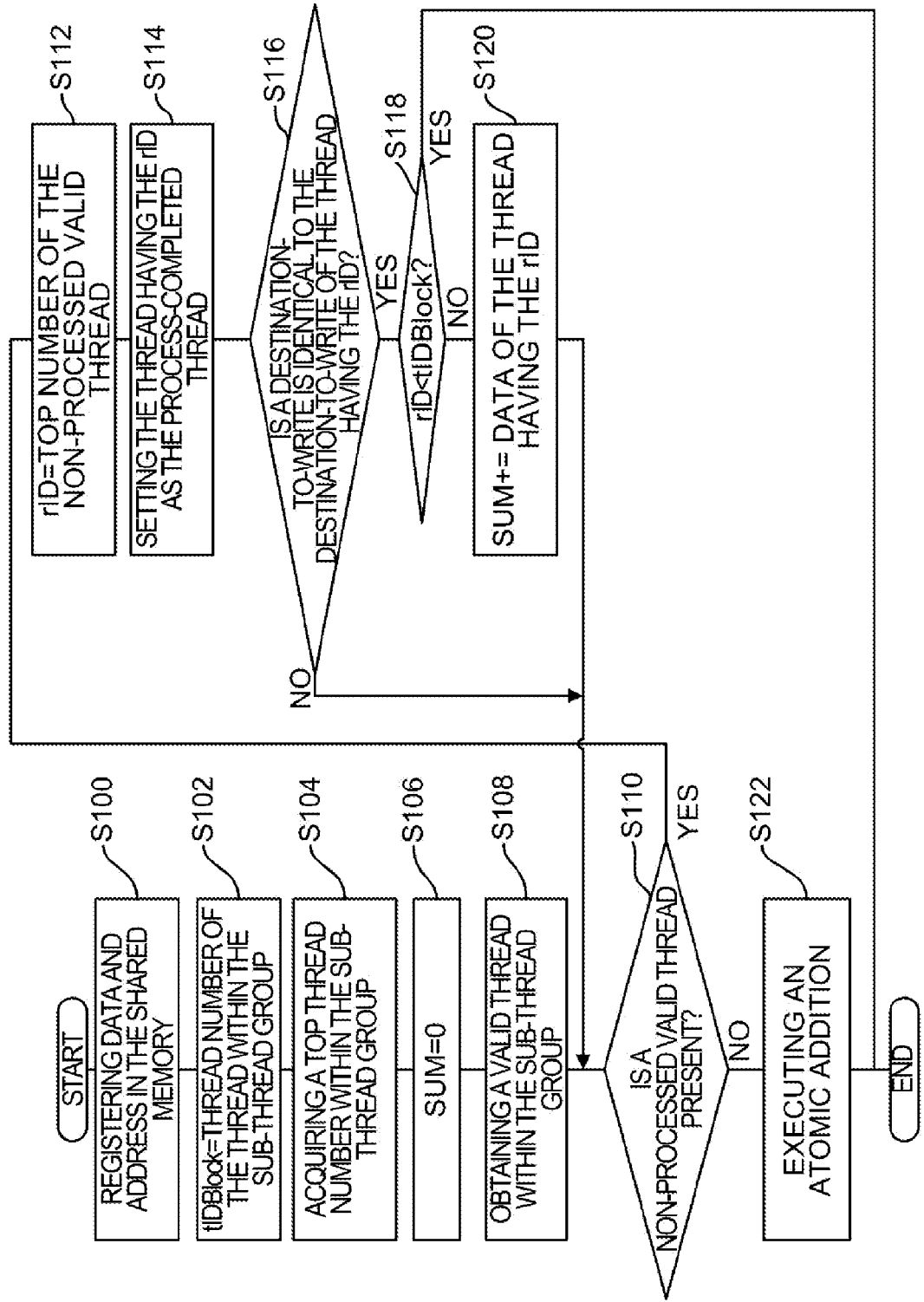
FIG. 4 illustrates an exemplary operation of the arithmetic processing apparatus illustrated in FIG. 3.

FIG. 4 illustrates an exemplary operation of the arithmetic processing apparatus illustrated in FIG. 3. FIG. 4 is an exemplary flow of the control program in which the number of times that the atomic process is executed is reduced compared to conventional techniques to efficiently execute the reduction operation. The thread scheduler 210 of the execution unit 200 fetches instructions such that the flow of FIG. 4 is executed in parallel by the plurality of the arithmetic cores 220. In other words, the flow of FIG. 4 is executed for each thread of the sub-thread group ST. In FIG. 4, the process represented by a bolded line indicates that an access to the shared memory 250 is generated or referencing by other threads within the sub-thread group is generated.

Figure 5:
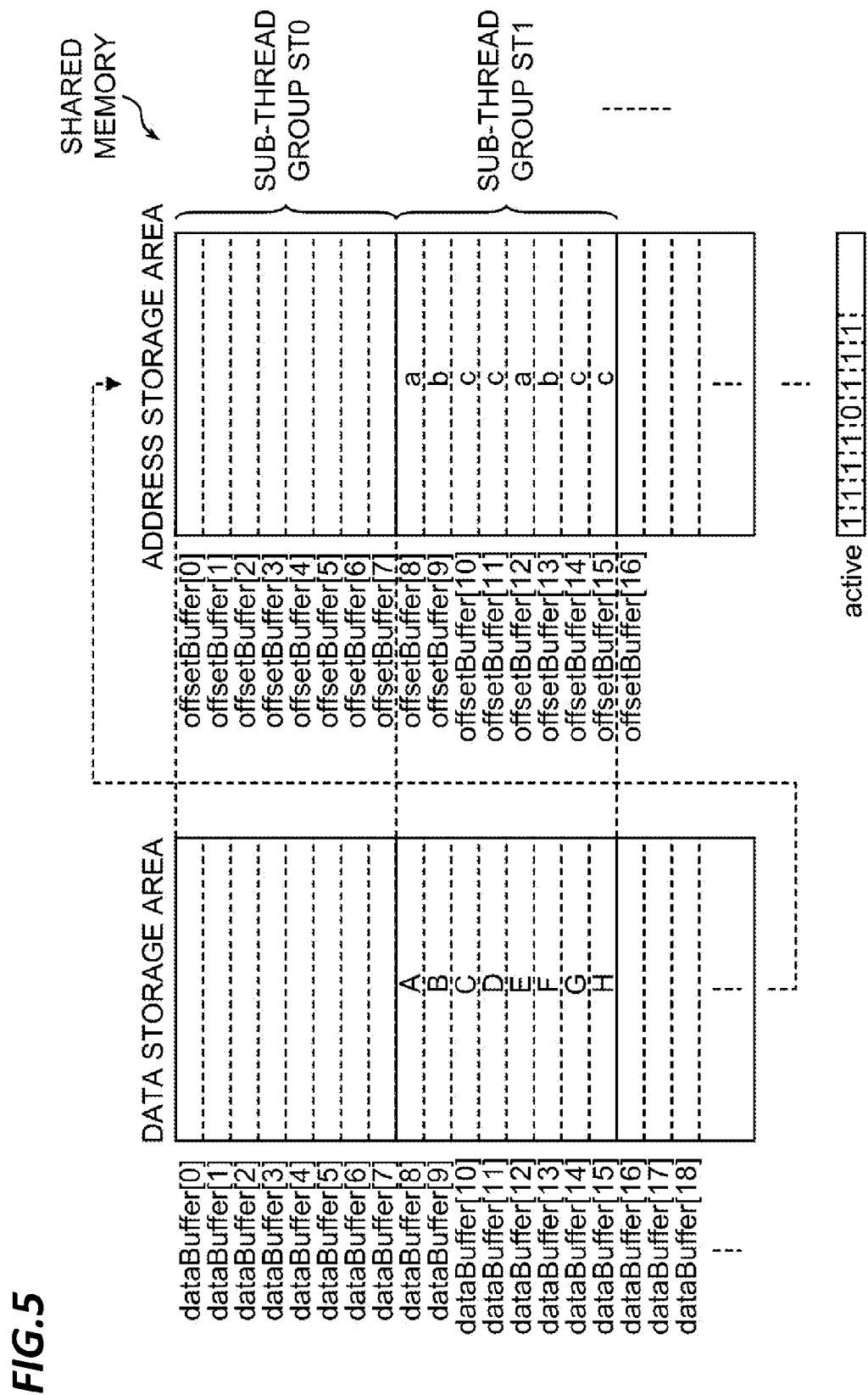
FIG. 5 illustrates examples of array variables registered with a shared memory illustrated in FIG. 3.

At step S100, the execution unit 200 registers a data storage area which stores data used in the reduction operation in the shared memory 250 as the array variable dataBuffer (see FIG. 5). Further, the execution unit 200 registers an address storage area which stores an address (hereinafter, referred to as a write address) indicating the storage area on the data memory 400 to which data is written in the shared memory 250 as the array variable offsetBuffer (see FIG. 5). For example, the write address indicates an area where a value of each bin is stored in a histogram generation process.

In this example, the number of threads of the sub-thread group is "8" which is identical to the number of the arithmetic cores 220 that execute the instruction. For example, in each sub-thread group ST (ST0, ST1, . . . ) illustrated in FIG. 5, a relative storage location of data of each thread and a relative storage location of the write address are represented using lower 3 (three) bits when suffixes of the array variable are indicated in a binary number. The data and the write address are given as arguments of the function included in the control program. For example, the write address indicates a predetermined storage location of the data memory 400 illustrated in FIG. 3.

At step S102, the execution unit 200 acquires a number indicating each thread of the sub-thread group ST and stores the number in an area tIDBlock. For example, the tIDBlock area is allocated in the register file 230 for each thread. For example, "0" is stored in the tIDBlock area for a first thread of the sub-thread group ST1 and "5" is stored in the tIDBlock area for a sixth thread of the sub-thread group ST1.

At step S104, the execution unit 200 acquires a first thread number within the sub-thread group ST being executed. The first thread number is the number of the thread within the thread group and is the same as a value of the subscript of each dataBuffer array variable and offsetBuffer array variable. For example, as illustrated in FIG. 5, the number of the first thread of the sub-thread group ST is "8".

At step S106, the execution unit 200 initializes the variable (sum) which stores a result of the reduction operation in the sub-thread group ST being executed as "0". For example, the variable (sum) is allocated in the register file 230 for each thread of the sub-thread group ST being executed.

At step S108, the execution unit 200 obtains a thread which is in an operation-executable state (hereinafter, referred to as a valid thread) in the sub-thread group ST. The thread except for the valid thread is a thread (hereinafter, referred to as an invalid thread) which does not need to execute the reduction operation. The execution unit 200 stores information indicating the valid thread in an identification area (active) within the shared memory 250. As illustrated in FIG. 5, for example, bit value of "1" indicating the valid thread and bit value of "0" indicating the invalid thread are assigned in the identification area of "active" by being corresponded to the each thread of the sub-thread group (8 bits in this example).

At step S110, the execution unit 200 determines whether there is a non-processed valid thread. For example, the execution unit 200 determines that the non-processed valid thread is present when the bit value of "1" is stored in the identification area (active), while the execution unit 200 determines that the non-processed valid thread is not present when the bit value of "1" is not stored in the identification area of "active". When the non-processed valid thread is present, the processes from step S112 to step S120 are executed. When the non-processed valid thread is not present, the process of step S112 is executed.

At step S112, the execution unit 200 obtains a start number of the thread numbers of the non-processed valid threads (that is, a smallest thread number of the thread numbers of the non-processed valid threads) and stores the obtained value of the first thread number in the variable rID. Hereinafter, the variable rID is also referred to as a target thread number rID. The variable rID is allocated in the register file 230 for each thread of the sub-thread group ST being executed.

At step S112 in which a thread number of one of the non-processed the valid threads is set to a target thread number rID, the invalid thread for which an execution of operation is not permitted is not set to the target thread number rID. Accordingly, an execution of the reduction operation may be avoided for invalid data.

At step S114, the execution unit 200 rewrites bit value of the identification area (active) corresponding to the thread indicated by the target thread number rID with "0", and sets the target thread as a process-completed thread.

At step S116, the execution unit 200 determines whether the write address of each valid thread is identical to the write address of the target thread. When it is determined that the write addresses are identical to each other, the process of step S118 is executed. When it is determined that the write addresses are different from each other, the process goes back to step S110.

At step S118, when the write addresses are identical to each other, the execution unit 200 determines whether the number of each valid thread is greater than the target thread number rID. When it is determined that the number of the valid thread is greater than the target thread number rID, the valid thread is determined as a thread which does not need to execute the reduction operation, and the process for the valid thread ends. The thread for which the process is completed is regarded as the valid thread as well as the target thread, but does not execute the process of step S122.

When it is determined that the number of the valid thread is less than or equal to the target thread number rID, the valid thread is determined as a thread which needs to execute the reduction operation (hereinafter, referred to as "operational thread"), and the processing of step S120 is executed.

At step S120, the execution unit 200 causes the operational thread to execute the reduction operation to add the thread data of the thread having the target thread number rID to the variable (sum) of the operational thread. After step S120, the process goes back to step S110. Further, as in FIG. 1 and FIG. 2, the reduction operation used in the present embodiment is also an operation which is executed using one type of operator for plural terms which is associative and commutative.

In the meantime, the non-processed valid thread is not present any more, at step S122, the execution unit 200 executes an atomic addition and adds the value of the variable (sum) in which data is stored to an area within the data memory 400 indicated by the write address.

FIG. 5 illustrates an example of array variables registered in the shared memory 250 illustrated in FIG. 3. As described above, data used for the reduction operation is stored in an area indicated by the array variable dataBuffer of the data storage area. Values A-H of the array variables dataBuffer [8]-dataBuffer[15] allocated to the sub-thread group ST1 represent examples of data. Values a, b, c of the array variables offsetBuffer[8]-offsetBuffer[15] allocated to the sub-thread group ST1 indicate (examples of) the write addresses. The data A-H and the address values a, b, c are used in the description of FIG. 6.

FIG. 6 illustrates an exemplary execution of the reduction operation according to the flow illustrated in FIG. 4. In this example, the sub-thread group ST1 contains eight threads represented by thread numbers tIDBlock=0-tIDBlock=7. The number of iterations of a loop corresponds to the number of "YES" branches at step S110 of FIG. 4. In this example, since the fifth thread (tIDBlock=4) is an invalid thread, the sub-thread group ST1 includes seven valid threads, and the number of loop iterations is seven.

The thread represented by a solid line indicates a valid thread and the thread represented by a dotted line indicates an invalid thread. The thread represented by a bolded line is a thread having a smallest thread number tIDBlock among the non-processed valid threads in each loop and also a target thread indicated by the variable rID at step S112 of FIG. 4. As illustrated in FIG. 6, for each loop, one of the valid threads among the predetermined number of threads is selected as the target thread in an ascending order of the thread number tIDBlock.

The thread represented by a net is a thread which satisfies "rID<tIDBlock" at step S118 as illustrated in FIG. 4, and is a thread for which the process ends. As described above, the thread for which the process is completed is regarded as the valid thread as well as the target thread, but does not execute processes of step S120 and step S122 as illustrated in FIG. 4. The data used by each thread and the address (that is, the write address) which indicates an area storing a result of the reduction operation are set to values as illustrated in FIG. 5.

In the first iteration of the loop, at step S116 of FIG. 4, each of the write addresses of seven valid threads is compared with the write address (=a) of a target thread (rID=tIDBlock=0). In this example, a thread which has the write address identical to the write address of the target thread is the target thread itself. Therefore, the target thread executes the processing of step S118 of FIG. 4.

Since the target thread (rID=tIDBlock=0) does not satisfy "rID<UDBlock" at step S118, the target thread executes the processing of step S120 and adds its data "A" to the variable (sum) ((a) in FIG. 6). That is, the thread (tIDBlock=0) executes the reduction operation. The write addresses of other valid threads except for the target thread are different from the write address of the target thread and thus, the first loop iteration ends.

In the second iteration of the loop, each of the write addresses of seven valid threads is compared with the write address (=b) of the target thread (rID=tIDBlock=1). Also, similar to the first iteration of the loop, the target thread itself executes the reduction operation in the processing of step S120 and its data "B" to the variable (sum) ((b) in FIG. 6). Since the sixth thread (tIDBlock=5) which has the write address identical to the write address of the target thread satisfy the "rID<UDBlock", as represented by a net, the sixth thread ends the process((c) in FIG. 6). The second iteration of the loop illustrated in FIG. 4 ends for the thread which ends the processing and thus, the thread does not execute the process of step S110 to step S122.

That is, the thread having a thread number larger than the thread number of the target thread in the threads which have the write address identical to the write address of the target thread ends the processing operation. Therefore, a thread of which data is already added to other thread does not execute the atomic process of step S122 of FIG. 4. Accordingly, even when a plurality of threads execute the flow illustrated in FIG. 4 in parallel, a phenomenon that a single data is added to be duplicated by a plurality of threads due to the atomic process of step S122 does not happen.

In the third iteration of the loop, similarly to the first iteration and the second iteration of the loop, the target thread (rID=tIDBlock=2) executes the reduction operation to add its data "C" to the variable (sum) ((d) in FIG. 6). Further, similarly to the second iteration of the loop, a fourth thread, a seventh thread and a eighth thread (tIDBlock=3, 6,7), which have the write address identical to the write address of the target thread, satisfy the "rID<UDBlock" at step S118. Therefore, the fourth thread, the seventh thread and the eighth thread end the processes as represented by the net and thereafter, do not execute the processes of step S110 to step S122 ((e), (f), (g) in FIG. 6).

In the fourth iteration of the loop, the threads which have the write address identical to the write address of the target thread (rID=tIDBlock=3) are the third thread, the fourth thread, the seventh thread and the eighth thread (tID-Block=2,3,6,7). Since the third thread (tIDBlock=2) does not satisfy "rID<tIDBlock" at step S118, the third thread (tIDBlock=2) executes the reduction operation in the processing of step S120 and adds data "D" of the target thread to the variable (sum) ((h) in FIG. 6).

That is, when a plurality of threads which have the write address identical to the write address of the target thread are present, the thread having the smallest thread number executes the reduction operation with data of the target thread and executes the atomic process of step S122. Further, accordingly, even when the plurality of threads execute the flow illustrated in FIG. 4 in parallel, a phenomenon that a single data is added to be duplicated by a plurality of threads due to the atomic process of step S122 does not happen. Since the fourth thread which is the target thread ends the process in the third iteration of the loop, the fourth thread does not execute the processes of step S110 to step S122 and does not execute an addition of data with the variable (sum) in the process of step S120 ((i) in FIG. 6).

In the fifth iteration of the loop, a thread which has the write address identical to the write address of the target thread (rID=tIDBlock=5) is the second thread (tIDBlock=1). Since the second thread does not satisfy "rID<tIDBlock" at step S118, the second thread (tIDBlock=1) executes the reduction operation in the processing of step S120 and adds data "F" of the target thread to the variable (sum (=B)) ((j) in FIG. 6). Since the sixth thread which is the target thread ends the process in the second iteration of the loop, the sixth thread does not execute the processes of step S110 to step S122 and does not execute addition of data with the variable (sum) in the processing of step S120 ((k) in FIG. 6).

Next, in the sixth iteration of the loop, the threads which have the write address identical to the write address of the target thread (rID=tIDBlock=6) are the third thread, the fourth thread, the seventh thread and the eighth thread (tIDBlock=2,3,6,7). Since the third thread (tIDBlock=2) does not satisfy "rID<UDBlock" at step S118, the thread (tIDBlock=2) executes the reduction operation in the processing of step S120 and adds data "G" of the target thread to the variable (sum (=C+D)) ((l) in FIG. 6).

Since the fourth thread and the seventh end the processing in the third iteration of the loop, the fourth thread and the seventh thread do not execute the processes of step S110 to step S122 and do not execute addition of data with the variable (sum) in the processing of step S120 ((m), (n) in FIG. 6). In other words, the thread (tIDBlock=2) having the smallest thread number among the threads which have the write address identical to the write address of the target thread executes the reduction operation with data of the target thread. Since the eighth thread ends the process in the third iteration of the loop, the eighth thread does not execute the addition of data with the variable (sum) in the process of step S120.

In the seventh iteration of the loop, the threads which have the write address identical to the write address of the target thread (rID=tIDBlock=7) are the third thread, the fourth thread, the seventh thread and the eighth thread (tIDBlock=2,3,6,7). Since the third thread (tIDBlock=2) does not satisfy "rID<UDBlock" at step S118, the third thread (tIDBlock=2) executes the reduction operation in the processing of step S120 and adds data "H" of the target thread to the variable (sum (=C+D+G)) ((o) in FIG. 6). Since the fourth thread and the seventh, and the eighth which is the target thread end the process in the third iteration of the loop, the fourth thread, the seventh and the eighth thread do not execute addition of data with the variable (sum) in the processing of step S120 ((p), (q), (r) in FIG. 6).

With the process as described above, seven data of A, B, C, D, E, F, G, H are not subjected to the atomic addition and added for each write address such that data of A, B, C, D, E, F, G, H are held as the variable (sums) of the first thread, the second thread and third thread. Thereafter, each of the three threads executes the atomic addition in the processing of step S122 illustrated in FIG. 4 and writes each of the variable (sums) in an area within the data memory 400 specified by the write address. In the example illustrated in FIG. 6, the number of times that the atomic addition is executed may be reduced from seven times for a case where the atomic addition is executed for each thread to three in which collision does not occur. As a result, as compared to conventional techniques, the operating speed of the arithmetic processing apparatus may be increased, and thus the efficiency of data processing by the arithmetic processing apparatus may be improved as well.

Figure 7:
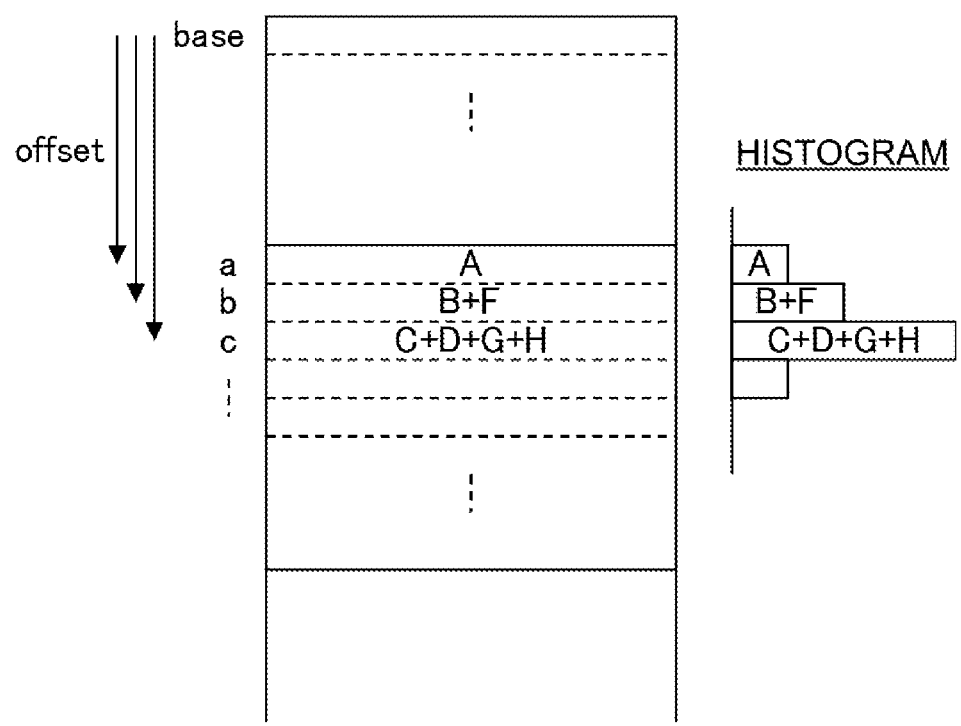
FIG. 7 illustrates examples of array variables registered with a data memory illustrated in FIG. 3.

FIG. 7 illustrates an example of array variable operations registered in a data memory 400 illustrated in FIG. 3. The "base" represents a start address of an array and the "offset" represents an index of the storage area to which data is added. Here, the values obtained as the offsets are illustrated as addresses a, b, c (the write addresses illustrated in FIG. 6) in order to make it easy to understand mutual corresponding relation with FIG. 6. Each data of A, B+F, C+D+G+H obtained by the reduction operation of FIG. 6 are written into each area indicated by the write addresses by the atomic addition. For example, in the creation of histogram, data of A, B, C, D, E, F, G, H are "1", respectively, and frequency of each bin is represented by the data of A, B+F, C+D+G+H written into the storage area.

The processes illustrated in FIG. 4 and FIG. 6 are not limited to the creation of histogram, and may be applied to the multiplication, computation of a maximum value and computation of a minimum value. In the multiplication where data is multiplied for each write address, at step S106 of FIG. 4, the variable "sum" is initialized to "1", and at step S120 of FIG. 4, the variable (sum) of the operational thread is multiplied by data of the target thread by the reduction operation. Further, in (a), (b), (d) of FIG. 6, the variable (sum(=1)) of the target thread is multiplied by data of the target thread by the reduction operation. Further, in (h), (j), (l), (o) of FIG. 6, the variable (sum) of the thread having the smallest thread number among the threads having the write address identical to the target thread number rID is multiplied by the data of the target thread.

In the process in which the maximum value is obtained for each write address, at step S106 in FIG. 4, the variable (sum) is initialized to a settable minimum value, and the larger one between the variable (sum) of the operational thread and the data of the target thread is set to a variable (sum) by the reduction operation at step S120 in FIG. 4. Further, in (a), (b), (d) of FIG. 6, the variable (sum) of the target thread (the minimum value set at step S106) is replaced with the data of the target thread by the reduction operation. Further, in (h), (j), (l), (o) of FIG. 6, the larger one between the variable (sum) of the thread having the smallest thread number among the threads having the write address identical to the target thread number rID and the data of the target thread is set to a variable (sum).

In the process in which the minimum value is obtained for each write address, at step S106 in FIG. 4, the variable (sum) is initialized to a settable maximum value, and the smaller one between the variable (sum) of the operational thread and the data of the target thread is set to a variable (sum) by the reduction operation at step S120 in FIG. 4. Further, in (a), (b), (d) of FIG. 6, the variable (sum) of the target thread (the maximum value set at step S106) is replaced with the data of the target thread by the reduction operation. Further, in (h), (j), (l), (o) of FIG. 6, the smaller one of between the variable (sum) of the thread having the smallest thread number among the threads having the write address identical to the target thread number rID and the data of the target thread is set to a variable (sum).

FIG. 8 illustrates an example of a control program executing the flow illustrated in FIG. 4. FIG. 8 is described using a Compute Unified Device Architecture (CUDA) (registered trademark) which is a development environment provided by the NVIDIA Corporation. Step numbers of S100 to S122 indicated at the left side of FIG. 8 illustrate a corresponding process of FIG. 4. In FIG. 8, the reduction operation for the double-precision floating point data is executed. Further, a thread group is referred to as a block and a sub-thread group is referred to as a warp in the GPU which is the product of NVIDIA Corporation. Accordingly, in following description, the thread group may be referred to as the block and the sub-thread group may be referred to as the warp.

The 1st line and the 2nd line describe a function header, and the "__device__" is a function executed by the GPU and indicates that the function may be called by the other functions executed by the GPU. As described in FIG. 7, the "base" and the "offset" indicate the start address of the array allocated to the data memory 400 of FIG. 3 and the index indicating the storage area to which data is added, respectively. As described in FIG. 5, the "dataBuffer" and the "offsetBuffer" indicate the array variable storing data allocated to the shared memory 250 and the array variable storing the write address, respectively.

With the description in the 3rd line, the data is written to the shared memory 250, and with the description in the 4th line, the write address is written to the shared memory 250, as described in FIG. 5. The "threadIdx.x" indicates a number of thread (serial number) within a block (thread group) as indicated by a numerical value indicating an array in FIG. 5. The ".x" of the "threadIdx.x" indicates that the threads are arranged in the x-direction (one dimension). When the threads are arranged in the x-direction, the y-direction and the z-direction (three dimensional), the number of thread (serial number) within the block is acquired by the following equation (2). In the equation (2), the "blockDim.x", "blockDim.y" and "blockDim.z" represents the x-direction, the y-direction and the z-direction of the block indicated three dimensionally, respectively. In the equation (2), the operator "*" indicates the multiplication.

$$(((threadIdx.z*blockDim.y)+threadIdx.y)*blockDim.x)+threadDix.x \quad (2)$$

With the description in the 5th line, the thread numbers are bit-wisely operated with a size "warpSize−1" of a warp to obtain each number of the thread within the warp. With the description in the 6th line, the thread number of the first thread within the warp is obtained.

In the description of the 7th line, the start address of areas in which data are stored within the shared memory is defined as wData in order to simplify the 20th line description. In the description of the 8th line, the start address of areas in which the write addresses are stored within the shared memory 250 is defined as wAddr in order to simplify the description of the 16th line.

With the description in the 10th line, the variable "sum" of each thread is initialized to "0". With the description in the 11th line, a valid thread within the warp is obtained and information indicating the valid thread are stored in an identification area (active) within the shared memory 250. Here, the "_ _ballot(true)" is a vote function of which a return value is a bit value of the valid thread which is set to "1" or a bit value of the invalid thread which is set to "0". The return value of the vote function is allocated to numbers of the threads within the warp 1-bit by 1-bit from the lowest of the area (active) [(from o (zero) to 7 (seven)) in an example illustrated in FIG. 6]. The "_ _brev" is a bit reversal function which returns reversed bits produced by taking a 32-bit argument and making an array of the bit values reverse by swapping lower bits with its corresponding upper bits recursively as a return value.

In the description of the 12th line, an initial mask value (mask) is calculated for resetting the bit corresponding to the thread for which the process has completed, which is represented by a net in FIG. 6, to "0" when the valid thread is being processed sequentially one by one in a loop starting from the 13th line.

With the description in the 13th line, the loop is iterated until all of the valid threads have completed its execution. Here, the "_ _popc(active)" is a population count function to obtain the number of the non-processed valid threads.

With the description in the 14th line, a target thread which corresponds to a thread having the smallest thread number among non-processed valid threads within a warp is obtained. Here, the "_ _clz(active)" is a count leading zero function which acquires a 32-bit integer as an argument to obtain the number of zeros which is being continued from the most significant bit.

With the description in the 15th line, a process for the target thread is completed using a value obtained by shifting the mask value (mask) rightward by the target thread number (rID). With the description in the 16th line, it is determined whether the write address of each valid thread is identical with the write address offset of the target thread. When it is determined that the write address and the write address offset are identical with each other ("Yes" at step S116 of FIG. 4), the process proceeds to the processing of the 17th line.

With the description in the 17th line, it is determined whether the number of each valid thread is larger than the target thread number (rID). When it is determined that the valid thread number is larger than the target thread number (rID), the valid thread is determined as a thread which does not need to execute a reduction addition. In this case, with the description in the 18th line, the remaining processes of the function are skipped and the function is returned to a function caller, and the process ends.

When the thread number of the valid thread is less than or equal to the target thread number (rID), the valid thread is determined as a thread which needs to execute a reduction addition, that is, an operational thread. In this case, with the description in the 20th line, the data of the target thread is added to the data of the valid thread. That is, the reduction operation which adds data of the threads for which the write addresses are identical with each other is executed within the warp.

With the description in the 23th line, data added within the warp by the reduction operation is added to the data stored in a predetermined storage area within the data memory 400 using the atomicAdd function. That is, with the description in the 20th line, the data added within the warp by the reduction operation is written into the data memory 400 by the atomic process.

The atomicAdd function called according to the description in the 23th line is a double-precision floating point atomic addition instruction. Even when the atomicAdd function is not supported for a double-precision floating point operation, the process may be implemented if the atomicCAS (Compare And Swap) function which is a 64-bit integer compare-and-swap instruction may be used. In this case, the atomicCAS function is used within a scope of description for implementing the atomicAdd function. The description regarding the double-precision floating point atomicAdd function using the atomicCAS function appears on "NVIDIA Co. CUDA C Programming Guide Version 4.2.: NVIDIA Co., 2012".

While an example in which the reduction addition is executed per warp is described in FIG. 8, an execution of the reduction addition per block (thread group) may be considered. In a case where the reduction addition is executed per block, the number of atomic additions is likely to be reduced further as compared to a case where the reduction addition is executed per warp.

Further, while the valid thread is scanned and the reduction addition is executed in FIG. 8, when the reduction addition is executed per block, the threads inside the block may be scanned similarly to FIG. 8. Alternatively, similar to the manner as in FIG. 8, the scanning and the reduction addition may be executed for each warp first and then, the scanning and the reduction addition may be executed for the block.

In the meantime, the thread has an instruction pointer per warp and is executed per warp. Therefore, when the reduction addition is executed per block which includes plural warps, the same instruction code may not be executed. Further, when the reduction addition is executed per block, a barrier synchronization may be enabled before and after data is written into the shared memory 250 using the "__syncthreads( )", but when a warp divergence is generated, a lock is likely to be generated. The "__syncthreads( )" is a function which enables a barrier synchronization between threads within the block, and all of the valid threads within the block need to reach the "__syncthreads( )". A thread which exceeds the "__syncthreads( )" is an invalid thread and thus, does not affect the reduction addition.

In contrast, when the reduction addition is executed per warp, synchronization is ensured per instruction and thus, an explicit barrier synchronization declaration may not be needed, such that a problem of lock may not be generated.

FIG. 9 illustrates an example of the control program which creates histogram using the atomicAddW function as illustrated in FIG. 8.

The 1st, 2nd and 3rd lines describe a function header, and the "__global__" is a function executed by the GPU and indicates that the function may be called by other functions executed by a host processor which is an upper level controller of the GPU. The "dstData" indicates a start address of array variables forming a histogram, and, for example, corresponds to an address value of "a" as illustrated in FIG. 7. The "numBin" indicates the number of bins, the "lower" indicates a lower limit of a histogram distribution, and the "width" indicates the bin width of a histogram (in this example, bin width having an equivalent width). The "srcData" indicates a start address of the area in which the original data used for creating a histogram are stored. The "numData" indicates the number of original data which creates a histogram. The "numThreads" indicates the number of threads of the block used for creating histogram.

With the descriptions in the 4th line and 5th line, the array variable dataBuffer (FIG. 5) used for storing data and the array variable offsetBuffer (FIG. 5) used for storing the write address in the shared memory 250 are secured. In this example, 128 areas for each block may be secured. For example, a single thread group includes 16 sub-thread groups STs (warps) each containing 8 (eight) threads as illustrated in FIG. 5.

With the description in the 6th line description, the number of thread to be processed within the block is substituted into the variable xID. Further, also in this example, the threads within the block are arranged in the x-direction (one dimension). With the description in the 7th line, when the thread number is less than the "numThreads", the thread is determined to be processed, and thus, the processes of the 8th, the 9th and 10th lines are executed.

With the description in the 8th line, the counter vale "offset" for the loop increases by a stride value "MAIMUM_THREADS" during the time period where the thread number is smaller than the number of data and thus, the 9th and 10th lines are executed. That is, data which forms histogram is segmented for each stride value "MAXIMUM_THREADS" and the loop is prepared and programmed to process the xID-th data among the segmented data.

With the description in the 9th line, a bin number binID within which the xID-th data falls is obtained. Also, with the description in the 10th line, the atomicAddW function illustrated in FIG. 8 is called. Each of the "dstData", "1", "binID", "dataBuffer", and "offsetBuffer" included in the 10th line corresponds to the "base", "data", "offset", "dataBuffer" and "offsetBuffer" included in 1st and 2nd line of FIG. 8, respectively.

The atomicAddW function is called to add "1" to a storage area which is obtained by adding an index indicating the bin number "binID" to the start address "dstData" of the histogram area. That is, the value of a predetermined bin in the histogram increases by "1". For example, 8 (eight) arithmetic cores 220 illustrated in FIG. 3 execute the control program illustrated in FIG. 3 in parallel, and each control program calls the control program illustrated in FIG. 8. Further, the processes in each loop illustrated in FIG. 6 are executed in parallel using the atomicAddW function.

FIG. 10 illustrates an example of a control program creating a histogram using the atomicAdd function. The control program of FIG. 10 is similar to the control program of FIG. 9 except that the control program of FIG. 10 does not include the 4th and 5th line descriptions of FIG. 9 and the atomicAdd function is called in the 8th line description of the control program, rather than the atomicAddW function of FIG. 8. The 1st, 2nd and 3rd line descriptions of FIG. 10 are similar to the first, second and third line descriptions of FIG. 9 except that the types of variables are different from each other. The 4th, 5th, 6th and 7th line descriptions of FIG. 10 are similar to the 6th, 7th, 8th and 9th line descriptions of FIG. 9.

In FIG. 10, the atomicAdd function in 8th line is called to add "1" to the histogram area indicated by the dstData [binID] array. The atomicAdd function is called to be duplicated by the plurality of threads, but a process having the same destination-to-write is sequentially executed due to an atomic process. That is, in FIG. 10, the atomicAdd function is called each time when the bin number binID within which the data is fallen is obtained, and a process having the same destination-to-write is sequentially executed. Accordingly, the operation efficiency of the control program of FIG. 10 is lower than that of the control program of FIG. 9.

Figure 11:
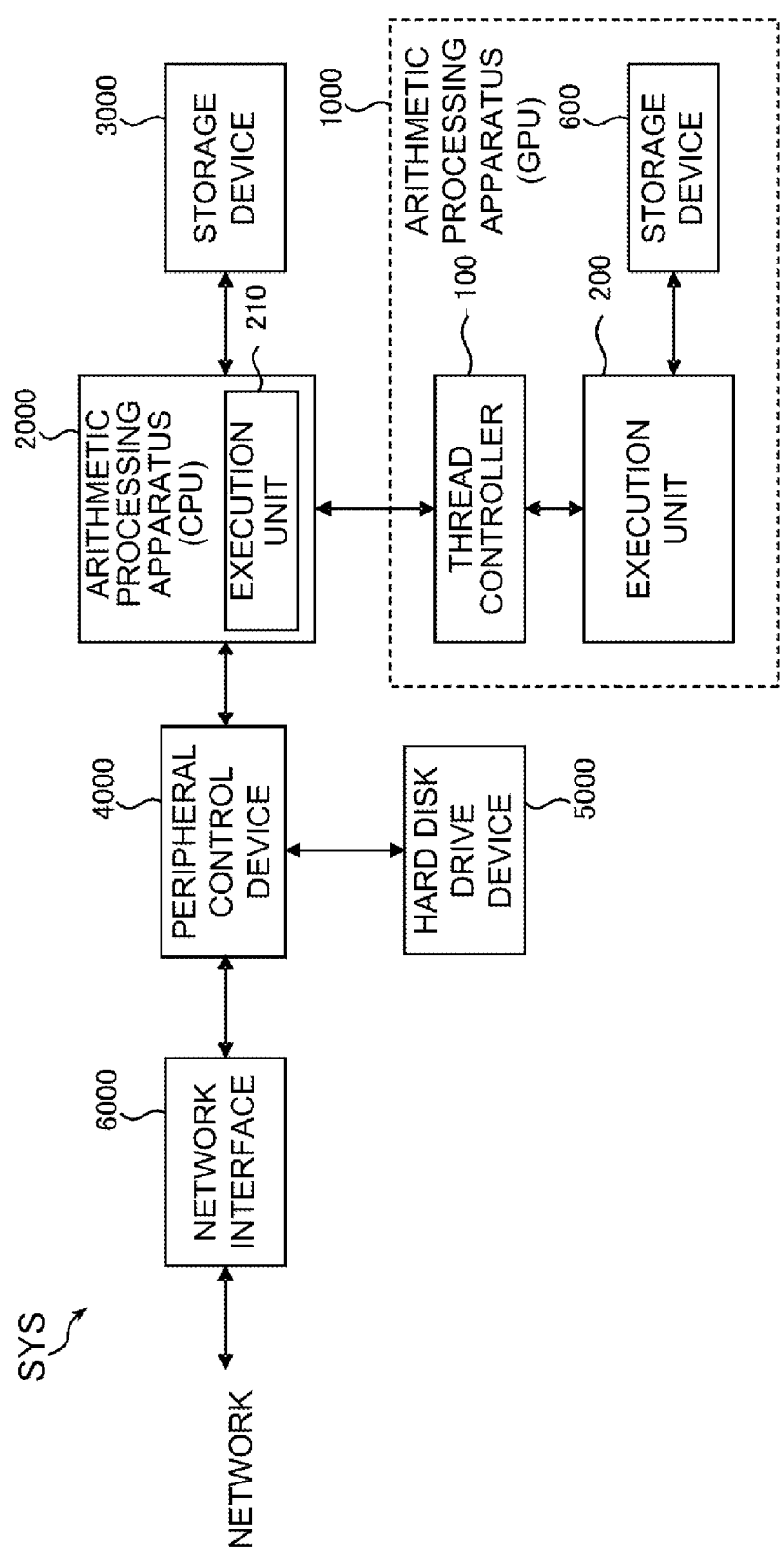
FIG. 11 illustrates an exemplary system equipped with the arithmetic processing apparatus illustrated in FIG. 3.

FIG. 11 illustrates an example of a system SYS on which the arithmetic processing apparatus illustrated in FIG. 3 is installed. The system SYS includes arithmetic processing apparatuses 1000, 2000, a storage device 3000, a peripheral control device 4000, a hard disk drive device 5000 and a network interface 6000. For example, the system SYS may be a computer system such as a server. Further, the configuration of the system SYS is not limited to the example illustrated in FIG. 11.

For example, the arithmetic processing apparatus 1000 may be a GPU, and the arithmetic processing apparatus 2000 may be a CPU. Further, the information processing apparatus 1000 may include a plurality of GPU cores and the information processing apparatus 2000 may include a plurality of CPU cores. The arithmetic processing apparatus 1000 includes the thread controller 100, the execution unit 200 and the storage device 600 as illustrated in FIG. 3.

For example, the storage device 600 may include the memory controller 300, the data memory 400 and the instruction memory 500 as illustrated in FIG. 3. For example, the storage device 600 may include a storage area which stores the control program executed by the execution unit 200 and the data executed by the control program. An example of the storage area which stores the data processed by the control program is illustrated in FIG. 7.

The arithmetic processing apparatus 2000 is an example of the upper level controller illustrated in FIG. 3, and includes the execution unit 210 which executes the data processing and also manages the data processing executed by the arithmetic processing apparatus 1000. For example, the storage device 3000 may include a data processing program executed by the execution unit 210 and the storage area which stores the data processed by the data processing program. Further, the storage device 3000 may be installed within the arithmetic processing apparatus 2000.

The peripheral control device 4000 controls the operations of the hard disk drive device 5000 and the network interface 6000 based on the instruction from the arithmetic processing apparatus 2000. For example, the hard disk drive device 5000 may store the information from a network and information to be output to the network. The network interface 6000 may control an information exchange between the system and the network.

For example, a program executed by each of the arithmetic processing apparatuses 1000, 2000 may be transferred from the network to the hard disk drive device 5000 or the storage device 400, 3000. Further, the peripheral control device 4000 may be connected to an optical drive device. In this case, the program executed by each of the arithmetic processing apparatuses 1000, 2000 is transferred to the hard disk drive device 5000 or the storage device 400, 3000 through an optical disk installed on the optical drive device.

Figure 12:
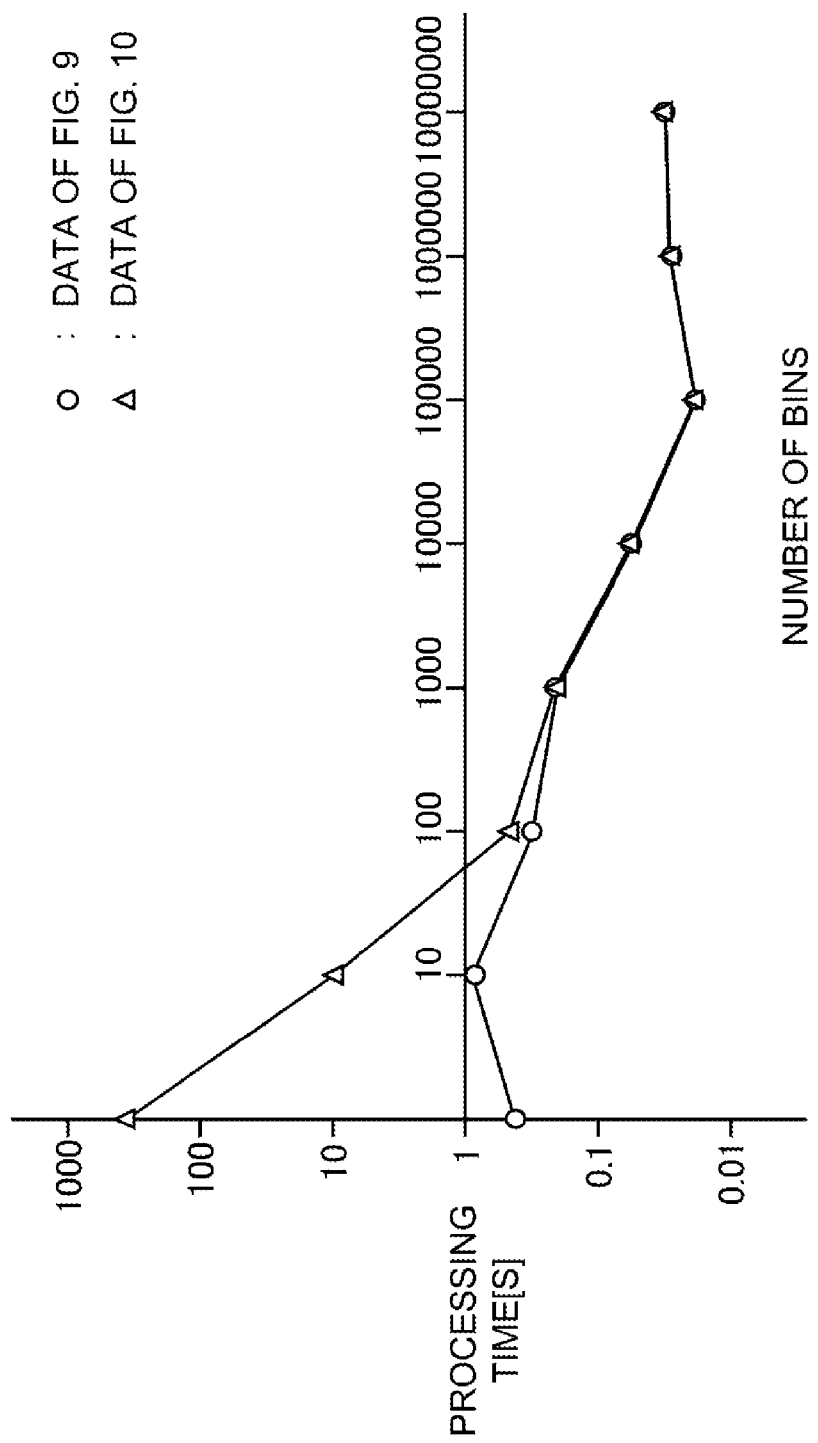
FIG. 12 illustrates the dependency of a required processing time on a bin count in creating the histogram by the control programs illustrated in FIG. 9 and FIG. 10.

FIG. 12 illustrates the dependency of the number of bins of a time required for creating the histogram by the control programs illustrated in FIG. 9 and FIG. 10. It is not particularly limited to, but in the evaluation of FIG. 12, the system SYS illustrated in FIG. 11 may be used. The arithmetic processing apparatus 1000 may be the GPU (C2075) which is the product of the NVIDIA Corporation and the arithmetic processing apparatus 2000 may be the CPU (Corei73960X) which is a product of the Intel (registered trademark) Corporation.

The data for the histogram used in the evaluation of FIG. 12 is produced from random numbers distributed uniformly, are values o (zero) to 1 (one) in a double-precision floating point, and the number of data are the number of $10^7$ (=numData). FIG. 12 illustrates processing time in each number of bins (=numBin) in a case where the number of bins illustrated in the horizontal axis changed from 1 to $10^7$.

For example, an area in which the number of bins (=numBin) of values of the double-precision floating point are stored may be secured as an array variable (corresponding to the bin of histogram) with "dstData" as a start address. The "lower" indicating a lower limit of the histogram distribution may be fixed to 0 (zero) and the "width" indicating a width of histogram may "1.0/numBin". The "numThreads" indicating the number of threads of the block used in creating histogram may be fixed to 1048576.

The features of FIG. 12 may be obtained using an atomic addition instruction (atomicAdd) which uses the atomic compare-and-swap instruction (atomicCAS) described with reference to FIG. 8. When the number of bins are small and the frequency of the competition is high (for example, the number of bins are several tens or less), the atomicAddW function may be more effective in reducing the processing time compared to the atomicAdd function. For example, for a single bin (numBin=1) where all of the atomic processes compete, the histogram created by the atomicAddW function (FIG. 9) may be created about 780 times faster as compared to the histogram created by the atomicAdd function (FIG. 10). This is because the number of times that data is added becomes increasing and the number of times that the atomic process (atomic addition) is executed becomes decreasing as the number of bins becomes smaller.

Further, when the histogram is created using an atomic addition instruction (atomicADD) of a 32-bit integer, the descriptions of FIG. 9 and FIG. 10 may be changed as follows. That is, the "double dstDATA" in the first line and the "double dataBuffer[128]" in the 4th line of FIG. 9 may be changed to the "int dstDATA" and the "int dataBuffer [128]", respectively. The "double dstDATA" of FIG. 10 may be changed to the "int dstDATA". In this case, in the "numBin=1", the histogram created by the atomicAddW function (FIG. 9) may be created about 8.6 times faster as compared to the histogram created by the atomicAdd function (FIG. 10).

FIG. 13 illustrates another example of a control program modified to execute the flow illustrated in FIG. 4 without using the shared memory. Details regarding the same description as that of FIG. 8 will be omitted. FIG. 13 illustrates a rewritten program of FIG. 8 using a shuffle instruction. The shuffle instruction makes it possible to exchange data between threads within a warp without using the shared memory 250. Descriptions regarding the shuffle instruction are made on "NVIDIA Co. CUDA C Programming Guide Version 4.2.: NVIDIA Co., 2012".

Since the shared memory 250 is not used in the program of FIG. 13, the description of FIG. 13 becomes a non-dependency in a shape of block. The "asm( )" used for making the program of FIG. 13 non-dependent is described in "Using Inline PTX Assembly In CUDA. NVIDIA Co., 2011.". The "%% laneid" is described at Chapter 9 of "PARALLEL THREAD EXECUTION ISA VERSION 3.0.: NVIDIA Co., 2012".

The descriptions of the 2nd line and 3rd line represent that the double-precision floating point data (64-bit) is stored by being divided into a 32-bit integer dataH and a 32-bit integer dataL. The descriptions of the 4th line and 5th line represent that the thread number within the warp is acquired and substituted into the variable "laneID". An assembler PTX (Parallel Thread eXecution) of CUDA is made to be built in by the "asm( )". By the PTX, the thread number within the warp may be directly acquired. Further, the functions of CUDA have no method to directly acquire the thread number within the warp.

With the descriptions in the 6th line, the variable "writeFlag" which stores the determination result of whether the atomic addition is to be executed in the thread itself is initialized. The descriptions of 8th line to the 11th line of FIG. 13 are similar to the descriptions of the 10th line to the 14th line of FIG. 8. In the description of the 12th line of FIG. 13, as in the descriptions of the 15th line of FIG. 8, the thread being executed becomes in a state where the process has been completed. The description of the 13th line of FIG. 13 determines whether its own destination-to-write is identical to a destination-to-write of the thread being processed. The "_ _shfl(offset, rID)" is a function to acquire an offset of the thread number rID of the thread within the warp.

In the description of the 14th line of FIG. 13, similar to the description of the 16th line of FIG. 8, it is determined whether the thread number of the thread within the warp is smaller than the thread number of the target thread within the warp. In the description of the 15th line of FIG. 13, when it is determined that the number of the thread being processed within the warp is smaller than the thread number of the target thread within the warp, the variable writeFlag is set to "false" which causes the atomic process not to be executed.

With the descriptions in the 17th line to 19th line, the data of the thread indicated by the thread number rID is acquired using the shuffle instruction. The "_ _shfl( )" handles the 32-bit integer and thus, the process is executed by dividing the acquired data into two 32-bits.

In the 20th line description, the reduction addition is executed within the warp, similar to the 20th line description of FIG. 8. With the description of the 23th line, it is determined whether the atomic process is to be executed. Also, in the description of the 24th line, a value produced from the reduction addition executed within the warp is added to the destination-to-write atomically, similar to the description of the 23th line of FIG. 8.

FIG. 14 illustrates another example of a control program modified to execute the flow illustrated in FIG. 4 without using the shared memory. Details of the same description as the descriptions of FIG. 8 and FIG. 13 will be omitted. In FIG. 8 and FIG. 13 described above, the index of array variable was used instead of the address because it is assumed that the access is made using the array variable and the number of bits in the index is smaller than in the actual address. FIG. 14 illustrates an example in which an address is used as it is for accessing the shared memory without using an index.

The "atomicAddW( )" of FIG. 14 is the same argument as the "atomicAdd( )". In the control program which uses the "atomicAdd( )" and does not use a return value from the "atomicAdd( )", the "atomicAdd( )" may be used by being replaced with an "atomicAddW( )". For example, the "atomicAdd( )" may be re-described with the "atomicAddW( )" in FIG. 10 as well.

In the function header described in the first line of FIG. 14, the "address" indicates the write address of data into the data memory 400, and the "data" indicates data to be added to an area specified by the write address.

The descriptions of the 2nd line and 3rd line of FIG. 14 are similar to the descriptions of the 2nd line and the 3rd line of FIG. 13. The descriptions of the 4th line and 5th line of FIG. 14 represent that the write address is stored by being divided into 32-bit integer addrH and 32-bit integer addrL. The descriptions of the 6th line to the 14th line of FIG. 14 are similar to the descriptions of the 4th line to 12th line of FIG. 13.

The description of the 15th line of FIG. 14 determines whether its own destination-to-write is identical to a destination to write of the thread being executed similar to the description of the 13th line of FIG. 13. The descriptions of the 16th line to the 25th line of FIG. 14 are similar to the descriptions of the 14th line to 23th line of FIG. 13. Also, in the description of the 26th line, a value produced from the reduction addition executed within the warp is added to the destination-to-write atomically, similar to the description of the 24th line of FIG. 13.

FIG. 15 illustrates another example of a control program modified to execute the flow illustrated in FIG. 4 without using the shared memory. Details of the same description as the descriptions of FIG. 8 and FIG. 14 will be omitted. In the program described in FIG. 15, a code which returns the value held in the memory before the atomic process is added to the program described in FIG. 14. Accordingly, a behavior like the existing "atomicAdd( )" may be realized in FIG. 15. That is, the compatibility may be maintained with the existing development environment where a value held in a memory before the atomic process is returned and a value held in a memory after the atomic process is returned. Further, similar to FIG. 14, the "atomicAdd( )" may be used in FIG. 15 as well by being replaced with an "atomicAddWR( )".

The descriptions of the 1st line to the 7th line of FIG. 15 are similar to descriptions of the 1st line to 7th line of FIG. 14. In the description of the 8th line of FIG. 15, the thread number of the thread which writes the data to the same write address of the data memory 400 is initialized. The descriptions of the 10th line to the 16th line of FIG. 15 are similar to the description of the 10th line to the 16h line of FIG. 14.

In the descriptions of the 17th line of FIG. 15, the thread number of the thread which writes the data to the same write address of the data memory 400 is updated. Here, the thread having the smallest thread number is responsible for the processing. The descriptions of the 20th line to the 23th line of FIG. 15 are similar to the descriptions of the 19th line to 22h line of FIG. 14.

In the description of the 27th line of FIG. 15, the variable "oldValue" which stores a value before the atomic process is initialized to "0". In the description of the 28th line of FIG. 15, it is determined whether the atomic process is to be executed. In the description of the 29th line of FIG. 15, a value produced from the reduction addition executed within the warp is added to the destination-to-write within the data memory 400 atomically and the value before the addition is substituted with the variable "oldValue". In the descriptions of the 32th line to the 37th line of FIG. 15, the "oldValue" is acquired from the thread which is responsible for writing. The "oldValue" is a 64-bit variable and thus, the "oldValue" is submitted and received by being divided into two 32-bit data.

In the description of the 39th line of FIG. 15, the "oldValue+(sum-data)" is returned as a return value of the function. Accordingly, the compatibility with the atomicAdd function is maintained. Further, since an error increases slightly when subtracting the "data" from the "sum", the "data" may be added to the "sum" only when the value is larger than its own thread number, in the descriptions of the 23th line of FIG. 15.

Further, in the descriptions from FIG. 7 to FIG. 15, an example (addition) creating a histogram is described, but the atomic process may be executed after the reduction operation is executed within the warp in the multiplication, computation of a maximum value and computation of a minimum value.

As described above, also in this embodiment, the frequency of the competition of the atomic processes may be reduced and, as compared to conventional techniques, the operating speed of the arithmetic processing apparatus may be increased, similar to the embodiments illustrated in FIG. 1 and FIG. 2. Accordingly, the efficiency of data processing by the arithmetic processing apparatus may be improved.

Further, in this embodiment, when a plurality of threads, each of which adds the data to the storage area which is the same as the storage area to which the data of the target thread is added, are present, a thread having the thread number equal to or less than the thread number of the target thread executes the reduction operation with data of the target thread. Further, the thread having the smallest thread number among the threads, each of which adds the data to storage area which is the same as the storage area to which data of the target thread is added, executes the atomic process.

Further, even when a plurality of threads execute the flow illustrated in FIG. 4 in parallel, a phenomenon that a single data is added to be duplicated by the plurality of threads due to the atomic process of step S122 does not happen. As a result, even when the reduction operation is executed by the plurality of threads, the arithmetic processing apparatus is able to obtain a correct operation result.

Further, the valid thread capable of executing an operation is sequentially set as a target thread and an invalid thread to which execution of an operation is not permitted is not set as the target thread, by the processes of steps S108, S110 and S112 of FIG. 4. Further, the reduction operation is executed for the data of the valid thread and not for the data of the invalid thread. Further, the execution of the reduction operation for the invalid data may be avoided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A non-transitory computer-readable storage medium storing a control program for controlling an arithmetic processing apparatus including a plurality of arithmetic cores and a control unit that controls the plurality of arithmetic cores, wherein the control program, when executed by a computer, controls the control unit to perform:
   causing an arithmetic core among the plurality of arithmetic cores that execute threads in parallel to determine whether threads among a selected predetermined number of threads have a same storage area to which data is written;
   causing the arithmetic core to execute, based on the determination, a reduction operation for data of threads determined to have the same storage area to which data is written; and
   causing the arithmetic core to add, by an atomic process, data obtained by the execution of the reduction operation to data stored within the same storage area to which data is written.

2. The non-transitory computer-readable storage medium according to claim 1, wherein the control program, when executed by a computer, further controls the control unit to perform:
   causing the arithmetic core to sequentially select one of the predetermined number of threads as a target thread;
   causing one of the threads which writes data to a storage area to which the target thread writes data to execute the reduction operation with data of the target thread; and
   after all of the predetermined number of threads have been selected as the target thread, causing a thread which executed the reduction operation to add the data obtained by the reduction operation to the data within a corresponding storage area by the atomic process.

3. The non-transitory computer-readable storage medium according to claim 2, wherein the control program, when executed by a computer, further controls the control unit to perform:
   causing an activity of one of the threads except for the target thread among the threads that write the data into the storage area to which the target thread writes data, to be ended.

4. The non-transitory computer-readable storage medium according to claim 2, wherein the program, when executed by a computer, further controls the control unit to perform:
   causing the arithmetic core to sequentially set a valid thread that is executable as the target thread; and
   causing the arithmetic core to execute the reduction operation for the data of the valid thread.

5. A control method of controlling an arithmetic processing apparatus including a plurality of arithmetic cores that execute threads in parallel and a control unit that controls the plurality of arithmetic cores, the control method comprising:
   causing an arithmetic core among the plurality of arithmetic cores that execute threads in parallel to determine whether threads among a selected predetermined number of threads have a same storage area to which data is written;
   causing the arithmetic core to execute, based on the determination, a reduction operation for data of threads determined to have the same storage area to which data is written; and
   causing the arithmetic core to add, by an atomic process, data obtained by the execution of the reduction operation to data stored within the same storage area to which data is written.

6. An arithmetic processing apparatus, comprising:
   a plurality of arithmetic cores configured to execute threads in parallel; and
   a control unit configured to:
   cause an arithmetic core among the plurality of arithmetic cores that execute threads in parallel to determine whether threads among a selected predetermined number of threads have a same storage area to which data is written;
   cause the arithmetic core to execute, based on the determination, a reduction operation for data of threads determined to have the same storage area to which data is written; and
   cause the arithmetic core to add, by an atomic process, data obtained by the execution of the reduction operation to data stored within the same storage area to which data is written.

* * * * *